(12) United States Patent
Reit et al.

(10) Patent No.: US 11,667,111 B2
(45) Date of Patent: Jun. 6, 2023

(54) METHOD FOR FORMING FLEXIBLE COVER LENS FILMS

(71) Applicant: Ares Materials Inc., Dallas, TX (US)

(72) Inventors: Radu Reit, Carrollton, TX (US); Adrian Avendano-Bolivar, Plano, TX (US); Apostolos Voutsas, Portland, OR (US); David Arreaga-Salas, Garland, TX (US)

(73) Assignee: Ares Materials Inc., Dallas, TX (US)

( * ) Notice: Subject to any disclaimer, the term of this patent is extended or adjusted under 35 U.S.C. 154(b) by 660 days.

(21) Appl. No.: 16/628,483

(22) PCT Filed: Jun. 19, 2018

(86) PCT No.: PCT/US2018/038349
§ 371 (c)(1),
(2) Date: Jan. 3, 2020

(87) PCT Pub. No.: WO2019/010001
PCT Pub. Date: Jan. 10, 2019

(65) Prior Publication Data
US 2020/0123410 A1 Apr. 23, 2020

Related U.S. Application Data

(60) Provisional application No. 62/529,352, filed on Jul. 6, 2017.

(51) Int. Cl.

| | |
|---|---|
| *B32B 27/28* | (2006.01) |
| *G02B 1/14* | (2015.01) |
| *C09D 7/41* | (2018.01) |
| *B29D 11/00* | (2006.01) |
| *C08G 75/045* | (2016.01) |
| *C08K 5/00* | (2006.01) |
| *C09D 181/02* | (2006.01) |
| *C08G 18/64* | (2006.01) |
| *C08G 18/38* | (2006.01) |
| *B29K 81/00* | (2006.01) |
| *C08K 5/132* | (2006.01) |
| *C08K 5/46* | (2006.01) |

(52) U.S. Cl.
CPC ...... *B32B 27/286* (2013.01); *B29D 11/00009* (2013.01); *B32B 27/28* (2013.01); *C08G 18/3855* (2013.01); *C08G 18/3876* (2013.01); *C08G 18/6453* (2013.01); *C08G 75/045* (2013.01); *C08K 5/0041* (2013.01); *C09D 7/41* (2018.01); *C09D 181/02* (2013.01); *G02B 1/14* (2015.01); *B29K 2081/04* (2013.01); *C08K 5/132* (2013.01); *C08K 5/46* (2013.01)

(58) Field of Classification Search
CPC .. C08G 75/045; C09D 181/02; C09D 181/04; C08J 3/28; G02B 1/14
See application file for complete search history.

(56) References Cited

U.S. PATENT DOCUMENTS

| | | | | |
|---|---|---|---|---|
| 4,125,644 | A | * | 11/1978 | Ketley ................. C09D 181/04 427/163.2 |
| 2009/0225425 | A1 | | 9/2009 | Jang et al. |
| 2009/0253805 | A1 | * | 10/2009 | Hoyle ................... C07C 323/52 426/106 |
| 2014/0199592 | A1 | | 7/2014 | Pyun et al. |
| 2014/0349130 | A1 | | 11/2014 | Petcavich et al. |
| 2015/0094420 | A1 | | 4/2015 | Nishimura et al. |
| 2015/0367621 | A1 | | 12/2015 | Murashige et al. |
| 2017/0025485 | A1 | * | 1/2017 | Kim .................... H01L 51/5237 |
| 2017/0092897 | A1 | | 3/2017 | Liu |
| 2017/0165950 | A1 | | 6/2017 | Leatherdale et al. |

FOREIGN PATENT DOCUMENTS

| | | | |
|---|---|---|---|
| JP | 2017-002267 | * | 1/2017 |
| WO | 2014207599 A1 | | 12/2014 |
| WO | WO 2016/113208 | * | 7/2016 |

OTHER PUBLICATIONS

International Search Report dated Sep. 10, 2018, issued in related International Application No. PCT/US2018/038349.
Arya Chem "Product Data Sheet—Thioplast EPS 25—Epoxidized Polysulfides" Version: Dec. 2003. Retrieved Aug. 15, 2018 (http://www.aryachem.com/EPS-25.php) section Properties.

* cited by examiner

Primary Examiner — Marc S Zimmer
(74) Attorney, Agent, or Firm — McGuireWoods LLP

(57) ABSTRACT

Display modules typically incorporate a transparent hard material such as glass on the outside of the module in order to better protect the display stack from scratches, dents, and other mechanical deformations. However, as displays move to novel form factors such as bendable, foldable, and reliable display modules, these transparent hard materials (e.g., glass) may not be used due to their limited flexibility. Therefore, it is desirable that replacement materials be sufficiently flexible while maintaining the desirable optical (e.g., >90% transmission and low yellow index) and mechanical properties (e.g., pencil hardness>H) that comparable glass hard materials offer.

18 Claims, 3 Drawing Sheets

METHOD FOR FORMING FLEXIBLE COVER LENS FILMS

BACKGROUND

Display modules typically incorporate a transparent hard material such as glass on the outside of the module in order to better protect the display stack from scratches, dents, and other mechanical deformations. However, as displays move to novel form factors such as bendable, foldable, and rollable display modules, these transparent hard materials (e.g., glass) may not be used due to their limited flexibility. Therefore, it is desirable that replacement materials be sufficiently flexible while maintaining the desirable optical (e.g., >90% transmission and low yellow index) and mechanical properties (e.g., pencil hardness>H) that comparable glass hard materials offer.

SUMMARY OF THE EMBODIMENTS

The embodiments relate to a method for forming a flexible cover lens. An example method embodiment comprises mixing at least one multifunctional thiol monomer and at least one multifunctional comonomer to provide a thiol-containing composition, depositing the thiol-containing resin on a substrate, curing the thiol-containing composition into an amorphous polysulfide- or polythiourethane thermoset film, and employing the polysulfide- or polythiourethane thermoset film as a flexible cover lens.

Additionally or alternatively, the method may include one or more of the following features individually or in combination: the multifunctional thiol monomer may have a molecular weight in a range between about 100 Da and about 10,000 Da and the multifunctional comonomer may have a molecular weight in a range between about 200 Da and about 20,000 Da. The thiol-containing resin may comprise the multifunctional thiol monomer in an amount between about 5 wt. % and about 95 wt. % and the multifunctional comonomer in an amount between about 5 wt. % and about 95 wt. %. The multifunctional thiol monomer may be selected from the group consisting of trimethylolpropane tris(3-mercaptopropionate); trimethylolpropane tris(2-mercaptoacetate); pentaerythritol tetrakis(2-mercaptoacetate); pentaerythritol tetrakis(3-mercaptopropionate); 2,2'-(ethylenedioxy)diethanethiol; 1,3-Propanedithiol; 1,2-ethanedithiol; 1,4-butanedithiol; tris[2-(3-mercaptopropionyloxy)ethyl] isocyanurate; 3,4-ethylenedioxythiophene; 1,10-decanedithiol; tricyclo[5.2.1.02,6]decanedithiol; benzene-1,2-dithiol; trithiocyanuric acid; dipentaerythritol hexakis(3-mercapto-propionate); 2,3-Di((2-mercaptoethyl)thio)-1-propanethiol; Dimercaptodiethyl sulfide; Ethoxylated Trimethylpropan-tri (3-mercapto-propionate); Ethoxylated Trimethylpropantri (3-mercapto-propionate); Polycaprolactone tetra 3-mercaptopropionate; Di-Pentaerythritolhexakis (3-mercaptopropionate); Di-Trimethylolpropanetetra (3-mercaptopropionate); Glycoldi (3-mercaptopropionate); Pentaerythritoltetramercaptoacetate; Trimethylol-propanetri-mercaptoacetate; Glycoldi-mercaptoacetate; and any combination thereof. The multifunctional comonomer may be selected from the group consisting of 1,3,5-triallyl-1,3,5-triazine-2,4,6 (1H,3H,5H)-trione; tricyclo[5.2.1.02,6]decanedimethanol diacrylate; divinyl benzene; diallyl bisphenol A (diacetate ether); diallyl terephthalate; diallyl phthalate; diallyl maleate; trimethylolpropane diallyl ether; ethylene glycol dicyclopentenyl ether acrylate; diallyl carbonate; diallyl urea; 1,6-hexanediol diacrylate; cinnamyl cinnamate; vinyl cinnamate; allyl cinnamate; allyl acrylate; crotyl acrylate; cinnamyl methacrylate; trivinylcyclohexane; 1,4-cyclohexanedimethanol divinyl ether; poly(ethylene glycol) diacrylate; tricyclodecane dimethanol diacrylate; bisphenol A ethoxylate diacrylate; tris[2-(acryloyloxy ethyl)]isocyanurate; trimethylolpropane triacrylate; pentaethrytolpropane tetraacrylate; dipentaethrytolpropane penta-/hexa-acrylate; poly(ethylene glycol) dimethacrylate; dimethanol dimethacrylate; bisphenol A ethoxylate dimethacrylate; trimethylolpropane trimethacrylate; pentaethrytolpropane tetramethacrylate; bisphenol A diglycidyl Ether; 4,4'-Methylenebis(N,N-diglycidylaniline); neopentyl glycol diglycidyl ether; tris(2,3-epoxypropyl) isocyanurate; trimethylolpropane triglycidyl ether i. 1,1'-(methylenedi-4,1-phenylene)bismaleimide; 1,6-di(maleimido)hexane; 1,4-di (maleimido)butane; N,N'-(1,3 phenylene) dimaleimide; isophorone diisocyanate; xylylene diisocyanate; tolylene diisocyanate; 1,4-diisocyanatobutane, 1,6-diisocyanatohexane, 1,8-diisocyanatooctane; vinyl norbornene; dicyclopentadiene; ethylidene norbornene; 1,3-Bis(2-isocyanato-2-propyl)benzene; 2,2-Bis(4-isocyanatophenyl) hexafluoropropane; 1,3-Bis(isocyanatomethyl)cyclohexane; Methylenediphenyl 4,4'-Diisocyanate; 3,3'-Dichloro-4,4'-diisocyanatobiphenyl; 4,4'-Diisocyanato-3,3'-dimethylbiphenyl; Dicyclohexylmethane 4,4'-Diisocyanate; 1,5-Diisocyanatonaphthalene; 1,3-Phenylene Diisocyanate; 1,4-Phenylene Diisocyanate; trimers thereof; and any combination thereof. The thiol-containing resin may comprise at least one of an initiator, an inhibitor, a dye, a photobase generator, a photoacid generator, or any combination thereof. The initiator may be selected from the group consisting of an organic peroxide, an inorganic peroxide, an azo-containing molecule, a benzophenone, a quinone, a thioxanthone, and any combination thereof. The inhibitor may be selected from the group consisting of a hindered phenolic molecule, a hindered amine molecule, a sulfide-containing molecule, a benzimidazole molecule, a phosphite-containing molecule, a benzotriazol molecule, a hydroxyphenol triazine molecule, and any combination thereof. The dye may be selected from the group consisting of a xanthene, an azobenzene, an anthroquinone (e.g., 1-methylamino anthraquinone), a triphenylmethane, a thianaphthenone, a benzanthrone, a benzothiazole, a phenothiazine, a thianthrene, and any combination thereof. The photobase generator may be selected from the group consisting of a co(m)-amine, an alkyl amine salt, an O-acyloxime, a benzyloxycarbonyl derivative, a formamide, and any combination thereof. The photoacid generator may be selected from the group consisting of an aryldiazonium salt, a diarylhalonium salt, a triarylsulfonium salt, a nitrobenzyl ester, a sulfone, a phosphate, a N-Hydroxyimide sulfonate, a sulfonic acid ester of phenol, a diazonaphthoquinone, a halogen-containing compound, an imino sulfonate, and any combination thereof. The depositing the thiol-containing resin on a substrate may comprise using a deposition method selected from the group consisting of slot-die coating, spin-coating, knife-over-roll coating, air knife coating, curtain coating, extrusion coating, dip coating, doctor blading, gravure printing, flexographic printing, and any combination thereof. The curing the thiol-containing resin into an amorphous polysulfide thermoset film may comprise curing the thiol-containing resin with ultraviolet light, visible light, heat, or any combination thereof. The polysulfide thermoset film may have a pencil hardness values of or above 1H, a bulk optical transparency in air above 90%, a bending stability of more than 100K cycles at a radius of curvature of 10 mm, and a yellow index below 5. The method may further comprise depositing a hard coat atop the polysulfide thermoset film. The method may further comprise attaching a superstrate protective liner to the polysulfide thermoset film.

BRIEF DESCRIPTION OF THE DRAWINGS

Illustrative examples of the present disclosure are described in detail below with reference to the attached drawing figures, which are incorporated by reference herein, and wherein.

DETAILED DESCRIPTION

The present disclosure relates to a method for forming a hard cover lens film from a thiol-containing resin. Specifically the method includes mixing and depositing a thiol-containing composition comprising one or more multifunctional thiol(s) and one or more multifunctional comonomer(s), curing the thiol-containing composition into a polysulfide- or polythiourethane thermoset film, and employing the polysulfide- or polythiourethane thermoset film as a flexible cover lens.

Cover lenses serve to protect the display modules they cover by providing mechanical resistance (e.g., scratch resistance, impact resistance, etc.) to the display cell underneath. In typical flat-panel displays, glass provides an excellent solution as it exhibits not only the requisite mechanical properties (i.e. pencil hardness up to 9H), but also enables important secondary properties such as high bulk optical transparency (e.g., >90%) and a low yellow index (e.g., <1). However, as display modules have begun to seek novel form factors such as displays that can bend, fold, or roll; glass cover lenses are no longer able to accommodate the dynamic motion of such display modules. While further flexibility can be imparted to glass cover lenses via geometric means such as thinning the glass panel, practical limits to this method exist due to the brittle nature of thinned glass panels.

Organic films such as polymers may serve as replacements as some polymer may provide the favorable mechanical and optical properties intrinsic to glass, while also allowing for thin geometries that may be more mechanically-robust (e.g., reduced chance of brittle failure). In doing so, the flexibility required for display products (e.g., >100,000 bending cycles to a minimum radius of curvature below 10 mm) may be possible. Current polymer films that are thermoplastic in nature (e.g., polyacrylics, polyesters, polycarbonates, etc.) are easy to process via industrially-scalable extrusion techniques; however, they exhibit very low resistance to temperature and solvents which makes their use undesirable in flexible display modules. Thermosetting polymer films provide greatly improved thermal and chemical stability; however, processing of many thermosetting resins require either inert atmospheres (e.g., thermosetting acrylics) or high-temperature processing (e.g., bismaleimide resins and resins that require processing at temperatures greater than 200° C.). Additionally, other resins lead to films that do not possess the required optical characteristics including >90% optical transparency and lowered yellow index<5. Through the use of thiol-containing resins, a resistance to environmental conditions (e.g., the presence of oxygen or moisture) is presented. Additionally, through the use of multifunctional thiols and multifunctional comonomers, a thermosetting resin can be designed such that high thermal and chemical resilience is engineered into the final polymer film.

Figure 1:
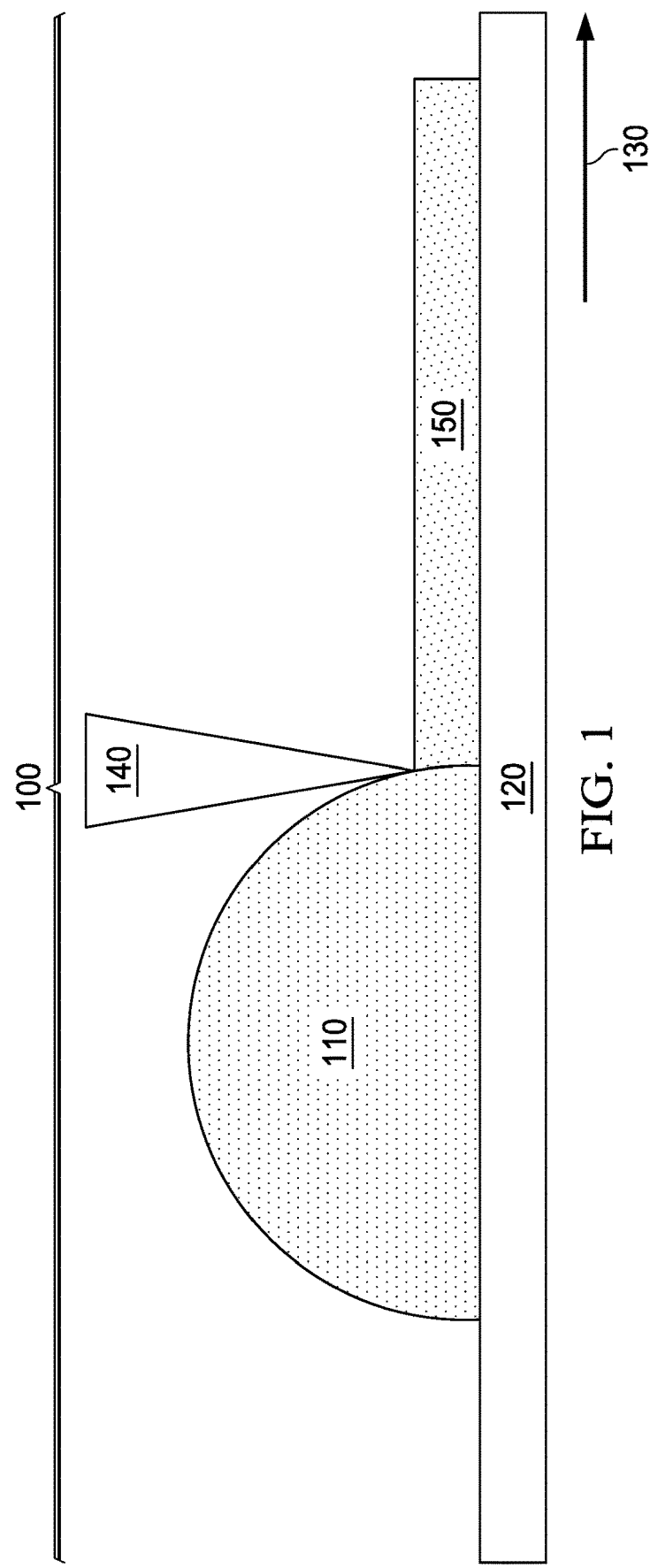
FIG. 1 demonstrates the use of an industrial coating technique such as knife coating to apply a controlled thickness of a thiol-containing resin atop a substrate material.

FIG. 1 shows an exemplary dispensing technique for controlling the thickness of the thiol-containing resin 100. Briefly, an excess of the thiol-containing resin 110 is deposited atop a substrate 120. As the substrate moves in a given direction 130, the thiol-containing resin encounters a knife 140 which reduces the thickness of the excess of the thiol-containing resin 110 to a controlled thickness 150. This deposition method may also adjust the smoothness of the surface of the thiol-containing resin 110.

Figure 2:
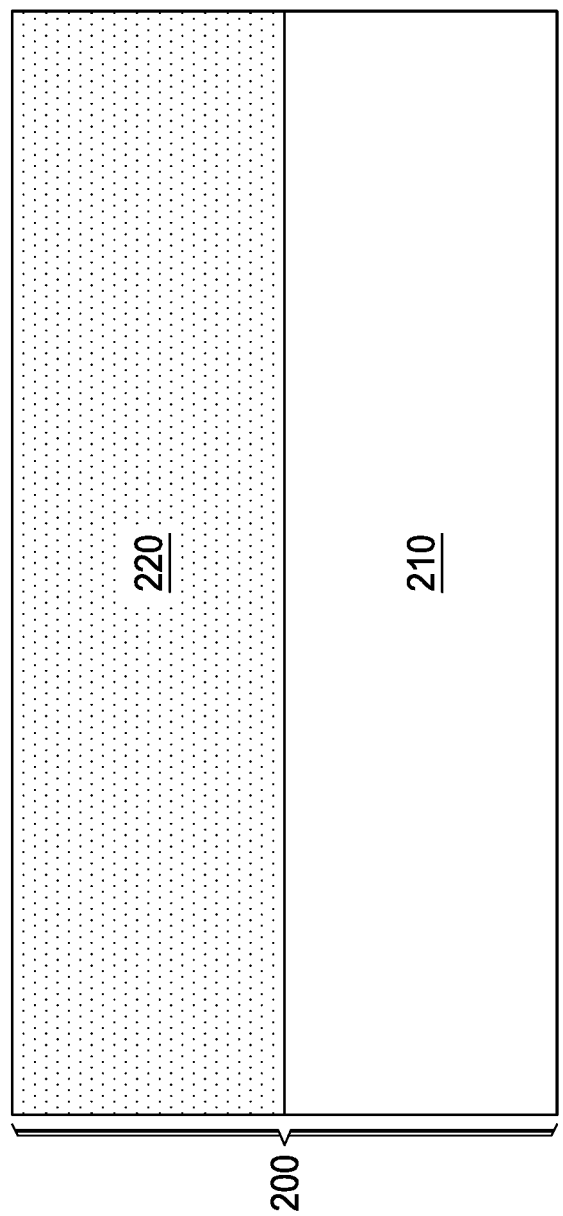
FIG. 2 is a cured polysulfide thermoset film which is to be used as a flexible cover lens film atop a substrate.

FIG. 2 shows a bilayer 200 comprising a cured polysulfide thermoset 220 atop a substrate 210. The substrate 210 serves as the web atop which the wet thiol-containing resin was deposited and further cured into a polysulfide thermoset 220 that may be used as a flexible cover lens.

Figure 3:
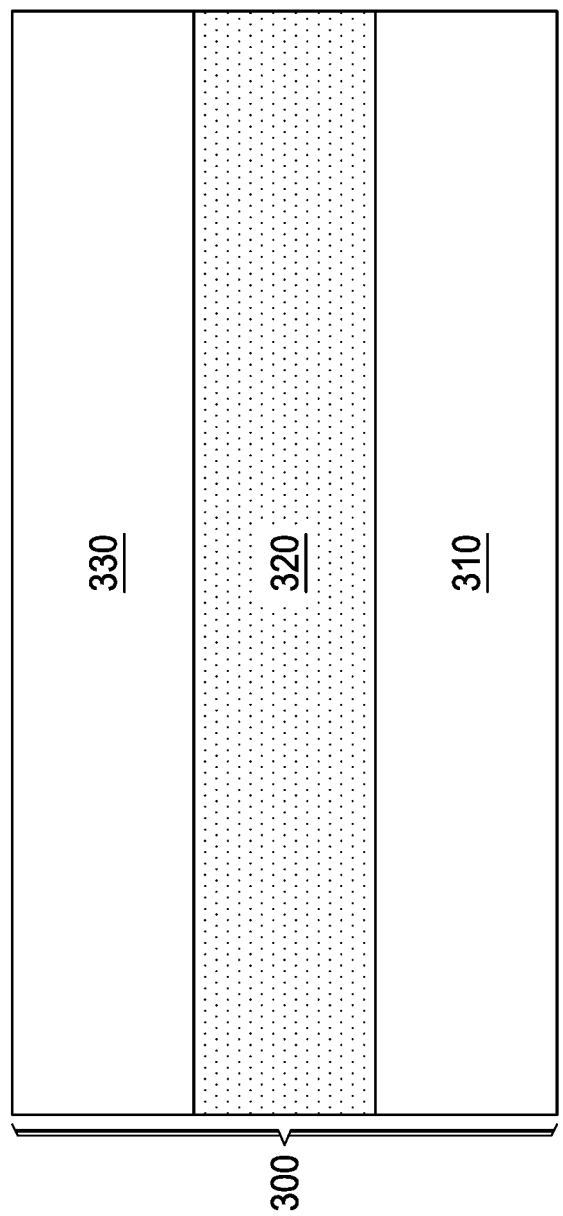
FIG. 3 is a cured polysulfide thermoset film which is to be used as a flexible cover lens film atop a substrate, with a protective superstrate film atop said polysulfide thermoset film.

FIG. 3 shows a trilayer 300 of a cured polysulfide thermoset 320 between a substrate 310 and superstrate 330. The substrate 310 serves as the web atop which the wet thiol-containing resin was deposited and further cured into a polysulfide thermoset 320 that may be used as a flexible cover lens. A superstrate 330 may be applied to the polysulfide thermoset 320 to protect the material before use in an end or intervening product.

In some embodiments, the thiol-containing resin comprises one or more multifunctional thiol monomers and one or more multifunctional comonomers. The multifunctional thiol monomers may include, but are not limited to, trimethylolpropane tris(3-mercaptopropionate); trimethylolpropane tris(2-mercaptoacetate); pentaerythritol tetrakis(2-mercaptoacetate); pentaerythritol tetrakis(3-mercaptopropionate); 2,2'-(ethylenedioxy)diethanethiol; 1,3-propanedithiol; 1,2-ethanedithiol; 1,4-butanedithiol; tris [2-(3-mercaptopropionyloxy)ethyl] isocyanurate; 3,4-ethylenedioxythiophene; 1,10-decanedithiol; tricyclo[5.2.1.02,6] decanedithiol; benzene-1,2-dithiol; trithiocyanuric acid; dipentaerythritol hexakis(3-mercaptopropionate); 2,3-di((2-mercaptoethyl)thio)-1-propanethiol; dimercaptodiethyl sulfide; ethoxylated trimethylpropan-tri(3-mercapto-propionate); ethoxylated trimethylpropantri(3-mercaptopropionate); polycaprolactone tetra 3-mercaptopropionate; di-Pentaerythritolhexakis (3-mercaptopropionate); di-Trimethylolpropanetetra (3-mercaptopropionate); glycoldi (3-mercaptopropionate); pentaerythritoltetramercaptoacetate; trimethylol-propanetri-mercaptoacetate; and glycoldimercaptoacetate; any derivatives thereof; or any combination thereof.

The multifunctional comonomers may include, but are not limited to, 1,3,5-triallyl-1,3,5-triazine-2,4,6 (1H,3H,5H)-trione; tricyclo[5.2.1.02,6] decanedimethanol diacrylate; divinyl benzene; diallyl bisphenol A (diacetate ether); diallyl terephthalate; diallyl phthalate; diallyl maleate; trimethylolpropane diallyl ether; ethylene glycol dicyclopentenyl ether acrylate; diallyl carbonate; diallyl urea; 1,6-hexanediol diacrylate; cinnamyl cinnamate; vinyl cinnamate; allyl cinnamate; allyl acrylate; crotyl acrylate; cinnamyl methacrylate; trivinylcyclohexane; 1,4-cyclohexanedimethanol divinyl ether; poly(ethylene glycol) diacrylate; tricyclodecane dimethanol diacrylate; bisphenol A ethoxylate diarylate; tris[2-(acryloyloxy ethyl)] isocyanurate; trimethylolpropane triacrylate; pentaethrytolpropane tetraacrylate;

dipentaethrytolpropane penta-/hexa-acrylate; poly(ethylene glycol) dimethacrylate; dimethanol dimethacrylate; bisphenol A ethoxylate dimetharylate; trimethylolpropane trimethacrylate; pentaethrytolpropane tetramethacrylate; bisphenol A diglycidyl Ether; 4,4'-Methylenebis(N,N-diglycidylaniline); neopentyl glycol diglycidyl ether; tris(2,3-epoxypropyl) isocyanurate; trimethylolpropane triglycidyl ether i. 1,1'-(methylenedi-4,1-phenylene) bismaleimide; 1,6-di(maleimido)hexane; 1,4-di(maleimido)butane; N,N'-(1,3 phenylene) dimaleimide; isophorone diisocyanate; xylylene diisocyanate; tolylene diisocyanate; 1,4-diisocyanatobutane, 1,6-diisocyanatohexane, 1,8-diisocyanatooctane; vinyl norbornene; dicyclopentadiene; ethylidene norbornene; 1,3-bis (2-isocyanato-2-propyl)benzene; 2,2-bis(4-isocyanatophenyl)hexafluoropropane; 1,3-bis(isocyanatomethyl) cyclohexane; methylenediphenyl 4,4'-Diisocyanate; 3,3'-dichloro-4,4'-diisocyanatobiphenyl; 4,4'-diisocyanato-3,3'-dimethylbiphenyl; dicyclohexylmethane 4,4'-diisocyanate; 1,5-diisocyanatonaphthalene; 1,3-phenylene siisocyanate; 1,4-phenylene diisocyanate; dimers thereof; trimers thereof; any derivatives thereof; or any combination thereof.

In some embodiments, the thiol-containing resin comprises from about 5 percent by weight (hereafter "wt. %") to about 95 wt. % of one or more multifunctional thiol monomers and from about 5 wt. % to about 95 wt. % of one or more multifunctional co-monomers. The concentration of the multifunctional thiol monomers or the multifunctional co-monomers may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the multifunctional thiol monomers or the multifunctional co-monomers may be about 5% wt. % of the thiol-containing resin, about 15% wt. % of the thiol-containing resin, about 25% wt. % of the thiol-containing resin, about 35% wt. % of the thiol-containing resin, about 45% wt. % of the thiol-containing resin, about 55% wt. % of the thiol-containing resin, about 65% wt. % of the thiol-containing resin, about 75% wt. % of the thiol-containing resin, about 85% wt. % of the thiol-containing resin, about or 95% wt. % of the thiol-containing resin. With the benefit of this disclosure, one of ordinary skill in the art will be able to obtain and prepare a thiol-containing resin for a given application.

In some embodiments, the thiol-containing resins comprise one or more multifunctional thiol monomers with a molecular weight below 10,000 Da, and one or more multifunctional co-monomers with a molecular weight below 20,000 Da. The molecular weight of the multifunctional thiol monomers or the multifunctional co-monomers may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the molecular weight of the multifunctional thiol monomers may be about 10,000 Da, 5,000 Da, 1000 Da, 950 Da, 900 Da, 850 Da, 800 Da, 750 Da, 700 Da, 650 Da, 600 Da, 550 Da, 500 Da, 450 Da, 400 Da, 350 Da, 300 Da, 250 Da, 200 Da, 150 Da, or about 100 Da or lower. Additionally, the molecular weight of the multifunctional co-monomers may be about 20,000 Da, 15,000 Da, 10,000 Da, 5,000 Da, 1000 Da, 950 Da, 900 Da, 850 Da, 800 Da, 750 Da, 700 Da, 650 Da, 600 Da, 550 Da, 500 Da, 450 Da, 400 Da, 350 Da, 300 Da, 250 Da, or 200 Da. With the benefit of this disclosure, one of ordinary skill in the art will be able to obtain and prepare a thiol-containing resin for a given application.

In some embodiments, the resin may further comprise an initiator, an inhibitor, a dye, a photobase generator, or a photoacid generator. The initiator may include, but is not limited to, an organic peroxide, an inorganic peroxide, an azo-containing molecule, a benzophenone (e.g., 2-Dimethoxy-2-phenylacetophenone), a quinone, a thioxanthone, or any combination thereof. The inhibitor may include, but is not limited to, a hindered phenolic molecule (e.g., 4-tert-Butylphenol), a hindered amine molecule, a sulfide-containing molecule, a benzimidazole molecule, a phosphite-containing molecule, a benzotriazol molecule, a hydroxyphenol triazine molecule, or any combination thereof. The dye may include, but is not limited to, a xanthene, an azobenzene, an anthroquinone (e.g., 1-methylamino anthraquinone), a triphenylmethane, a thianaphthenone, a benzanthrone, a benzothiazole, a phenothiazine, a thianthrene, or any combination thereof. The photobase generator may include, but is not limited to, a co(m)-amine and/or alkyl amine salt, an O-acyloxime, a benzyloxycarbonyl derivative, a formamide, or any combination thereof. The photoacid generator may be from the following families: an aryldiazonium salt, a diarylhalonium salt, a triarylsulfonium salt (e.g., Triphenylsulfonium triflate), a nitrobenzyl ester, a sulfone, a phosphate, a N-Hydroxyimide sulfonate, a sulfonic acid ester of phenol, a diazonaphthoquinone, a halogen-containing compound, an imino sulfonate or any combination thereof.

In some embodiments, the thiol-containing resin may be deposited using any sufficient deposition method. Examples of deposition methods may include, but are not limited to, slot-die coating, spin-coating, knife-over-roll coating, air knife coating, curtain coating, extrusion coating, dip coating, doctor blading, gravure printing, flexographic printing, or any combination thereof.

In some embodiments, the thiol-containing resin may be cured into the polysulfide thermoset film via ultraviolet light, visible light, heat, or any combination thereof.

In some embodiments, the polysulfide thermoset film has a pencil hardness value of or above 1H, a bulk optical transparency in air above 90%, a bending stability of more than 100K cycles at a radius of curvature of 10 mm, and/or a yellow index below 5.

In some embodiments, the polysulfide thermoset film has an optional hard coat that is subsequently deposited atop the cover lens film to further increase pencil hardness.

In some embodiments, the substrate atop which the polysulfide thermoset film is coated and cured is a metal foil, a glass sheet, or another organic foil such as a polyethylene or polyester liner.

In some embodiments, the superstrate that lays atop the polysulfide thermoset film is a metal foil, a glass sheet, or another organic foil such as a polyethylene or polyester liner.

In some embodiments, a display stack comprises an emissive, transmissive or reflective display, a liquid or film-type optically clear adhesive, a touch sensor, a color filter, a polarizer, or any combination thereof.

EXAMPLE 1

10.3 g of a thiol-containing resin was prepared by mixing 6.919 g trimethylolpropane tris(3-mercaptopropionate), 3.076 g 1,3,5-Triallyl-1,3,5-triazine-2,4,6(1H,3H,S5H)-trione, 0.1 g 2,2-Dimethoxy-2-phenylacetophenone, and 0.15 g 4-tert-Butylphenol. This resin solution was then coated atop a glass substrate using a doctor blade to a target wet thickness of 50 μm. Next, the resin was exposed to 300 mJ/cm$^2$ of 254 nm light to initiate the polymerization, yielding a 50 μm polysulfide thermoset film. No inert atmospheres or elevated temperatures were used during the curing of the planarization resin. The polysulfide thermoset film was then removed from the glass carrier and tested for pencil hardness in accordance with ASTM D3363 to yield a pencil hardness of 1H. UV-Vis spectra of the material showed a bulk transparency versus air of >90% at 450 nm and the sample withstood more than 200,000 bending cycles at a radius of curvature of 2 mm.

What is claimed is:

1. A method for forming a flexible cover lens comprising:
   mixing at least one multifunctional thiol monomer and at least one multifunctional comonomer to provide a thiol-containing composition, wherein the thiol-containing composition further comprises a dye selected from the group consisting of a xanthene, an azobenzene, an anthroquinone, a triphenylmethane, a thianaphthenone, a benzanthrone, a benzothiazole, a phenothiazine, a thianthrene, and any combination thereof;
   depositing the thiol-containing composition on a substrate;
   curing the thiol-containing composition into an amorphous thermoset film, and
   employing the thermoset film as a flexible cover lens by removing the substrate and coupling the thermoset film to a display stack.

2. The method of claim 1, wherein the at least one multifunctional thiol monomer has a molecular weight in a range between about 100 Da and about 10,000 Da and the at least one multifunctional comonomer has a molecular weight in a range between about 200 Da and about 20,000 Da.

3. The method of claim 1, wherein the thiol-containing composition comprises the multifunctional thiol monomer in an amount between 5 wt. % and about 95 wt. % and the multifunctional comonomer in an amount between about 5 wt. % and about 95 wt. %.

4. The method of claim 1, wherein the multifunctional thiol monomer is selected from the group consisting of trimethylolpropane tris(3-mercaptopropionate); trimethylolpropane tris(2-mercaptoacetate); pentaerythritol tetrakis(2-mercaptoacetate); pentaerythritol tetrakis(3-mercaptopropionate); 2,2'-(ethylenedioxy)diethanethiol; 1,3-Propanedithiol; 1,2-ethanedithiol; 1,4-butanedithiol; tris[2-(3-mercaptopropionyloxy)ethyl] isocyanurate; 1,10-decanedithiol; tricyclo[5.2.1.0.02,6]decanedithiol; benzene-1,2-dithiol; trithiocyanuric acid; dipentaerythritol hexakis(3-mercaptopropionate); 2,3-Di((2-mercaptoethyl)thio)-1-propanethiol; Dimercaptodiethylsulfide; Ethoxylated Trimethylpropan-tri(3-mercapto-propionate); Ethoxylated Trimethylpropantri(3-mercapto-propionate); Polycaprolactone tetra 3-mercaptopropionate; Di-Pentaerythritolhexakis (3-mercaptopropionate); Di-Trimethylolpropanetetra (3-mercaptopropionate); Glycoldi (3-mercaptopropionate); Pentaerythritoltetramercaptoacetate; Trimethylol-propan-etri-mercaptoacetate; Glycoldi-mercaptoacetate; and any combination thereof.

5. The method of claim 1, wherein the multifunctional comonomer is selected from the group consisting of 1,3,5-triallyl-1,3,5-triazine-2,4,6 (1H,3H,5H)-trione; tricyclo [5.2.1.02,6] decanedimethanol diacrylate; divinyl benzene; diallyl bisphenol A (diacetate ether); diallyl terephthalate; diallyl phthalate; diallyl maleate; trimethylolpropane diallyl ether; ethylene glycol dicyclopentenyl ether acrylate; diallyl carbonate; diallyl urea; 1,6-hexanediol diacrylate; cinnamyl cinnamate; vinyl cinnamate; allyl cinnamate; allyl acrylate; crotyl acrylate; cinnamyl methacrylate; trivinylcyclohexane; 1,4-cyclohexanedimethanol divinyl ether; poly(ethylene glycol) diacrylate; tricyclodecane dimethanol diacrylate; bisphenol A ethoxylate diacrylate; trimethylolpropane triacrylate; pentaethrytolpropane tetraacrylate; dipentaethrytolpropane penta-/hexa-acrylate; poly(ethylene glycol) dimethacrylate; dimethanol dimethacrylate; bisphenol A ethoxylate dimetharylate; trimethylolpropane trimethacrylate; pentaethrytolpropane tetramethacrylate; bisphenol A diglycidyl Ether; 4,4'-Methylenebis(N,N-diglycidylaniline); trimethylolpropane triglycidyl ether i. 1,1'-(methylenedi-4,1-phenylene) bismaleimide; 1,6-di(maleimido)hexane; 1,4-di(maleimido)butane; N,N'-(1,3 phenylene) dimaleimide; vinyl norbornene; dicyclopentadiene; ethylidene norbornene; trimers thereof; and any combination thereof.

6. The method of claim 1, wherein the thiol-containing composition comprises an initiator, an inhibitor, a photobase generator, a photoacid generator, or any combination thereof.

7. The method of claim 6, wherein the thiol-containing composition comprises the initiator, and wherein the initiator is selected from the group consisting of an organic peroxide, an inorganic peroxide, an azo-containing molecule, a benzophenone, a quinone, a thioxanthone, and any combination thereof.

8. The method of claim 6, wherein the thiol-containing composition comprises the inhibitor, and wherein the inhibitor is selected from the group consisting of a hindered phenolic molecule, a hindered amine molecule, a sulfide-containing molecule, a benzimidazole molecule, a phosphite-containing molecule, a benzotriazol molecule, a hydroxyphenol triazine molecule, and any combination thereof.

9. The method of claim 6, wherein the thiol-containing composition comprises the photobase generator, and wherein the photobase generator is selected from the group consisting of a co(m)-amine, an alkyl amine salt, an O-acyloxime, a benzyloxycarbonyl derivative, a formamide, and any combination thereof.

10. The method of claim 6, wherein the thiol-containing composition comprises the photoacid generator, and wherein the photoacid generator is selected from the group consisting of an aryldiazonium salt, a diarylhalonium salt, a triarylsulfonium salt, a nitrobenzyl ester, a sulfone, a phosphate, a N-Hydroxyimide sulfonate, a sulfonic acid ester of phenol, a diazonaphthoquinone, a halogen-containing compound, an imino sulfonate, and any combination thereof.

11. The method of claim 1, wherein the depositing the thiol-containing composition on a substrate comprises using a deposition method selected from the group consisting of slot-die coating, spin-coating, knife-over-roll coating, air knife coating, curtain coating, extrusion coating, dip coating, doctor blading, gravure printing, flexographic printing, and any combination thereof.

12. The method of claim 1, wherein the curing the thiol-containing resin composition into an amorphous thermoset film comprises curing the thiol-containing resin with ultraviolet light, visible light, heat, or any combination thereof.

13. The method of claim 1, wherein the thermoset film has a pencil hardness value of or above 1H, a bulk optical transparency in air above 90%, a bending stability of more than 100K cycles at a radius of curvature of 10 mm, and a yellow index below 5.

14. The method of claim 1, further comprising depositing a hard coat atop the thermoset film.

15. The method of claim 1, further comprising attaching a superstrate protective liner to the thermoset film.

16. The method of claim 1, wherein the display stack comprises an emissive, transmissive or reflective display, a liquid or film-type optically clear adhesive, a touch sensor, a color filter, a polarizer or any combination thereof.

17. The method of claim 1, wherein the substrate is a metal foil, a glass sheet, a polyethylene liner, a polyester liner, or a combination thereof.

18. A method for forming a flexible cover lens comprising:

mixing at least one multifunctional thiol monomer of pentaerythritol tetrakis(3-mercaptopropionate) and at least one multifunctional comonomer of isophorone diisocyanate to provide a thiol-containing composition; wherein the thiol-containing composition further comprises a dye selected from the group consisting of a xanthene, an azobenzene, an anthroquinone, a triphenylmethane, a thianaphthenone, a benzanthrone, a benzothiazole, a phenothiazine, a thianthrene, and any combination thereof;

depositing the thiol-containing composition on a silicone-coated polyester substrate;

curing the thiol-containing composition into an amorphous polythiourethane thermoset film, and employing the polythiourethane thermoset film as a flexible cover lens atop a flexible display module by removing the substrate and coupling the polythiourethane thermoset film to a display stack.

\* \* \* \* \*